(12) United States Patent
Fukawatase et al.

(10) Patent No.: US 10,173,624 B2
(45) Date of Patent: Jan. 8, 2019

(54) OCCUPANT PROTECTING DEVICE FOR VEHICLE

(71) Applicant: TOYOTA JIDOSHA KABUSHIKI KAISHA, Toyota-shi (JP)

(72) Inventors: Osamu Fukawatase, Miyoshi (JP); Motoki Sugiyama, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/664,147

(22) Filed: Jul. 31, 2017

(65) Prior Publication Data

US 2018/0037181 A1 Feb. 8, 2018

(30) Foreign Application Priority Data

Aug. 2, 2016 (JP) ................. 2016-152119

(51) Int. Cl.
| | |
|---|---|
| *B60R 21/013* | (2006.01) |
| *B60R 21/0134* | (2006.01) |
| *B60R 21/0136* | (2006.01) |
| *B60Q 9/00* | (2006.01) |
| *B60R 22/36* | (2006.01) |
| *B60R 21/01* | (2006.01) |

(52) U.S. Cl.
CPC ............ *B60R 21/0134* (2013.01); *B60Q 9/00* (2013.01); *B60R 22/36* (2013.01); *B60R 2021/01027* (2013.01); *B60R 2021/01272* (2013.01); *B60R 2021/01286* (2013.01)

(58) Field of Classification Search
None
See application file for complete search history.

(56) References Cited

U.S. PATENT DOCUMENTS

| | | |
|---|---|---|
| 5,552,986 A | 9/1996 | Omura et al. |
| 2005/0030166 A1 | 2/2005 | Kraus et al. |
| 2007/0102915 A1 | 5/2007 | Odate |

(Continued)

FOREIGN PATENT DOCUMENTS

| | | | |
|---|---|---|---|
| EP | 1 838 550 B1 | 4/2008 | |
| EP | 2837538 A1 * | 2/2015 | .......... B60W 50/087 |

(Continued)

*Primary Examiner* — Thomas G Black
*Assistant Examiner* — Demetra R Smith-Stewart
(74) *Attorney, Agent, or Firm* — Oblon, McClelland, Maier & Neustadt, L.L.P.

(57) ABSTRACT

An occupant protecting device for a vehicle, including: a pretensioner applying tension to a webbing that is configured to restrain an upper body of a vehicle occupant seated in a vehicle seat; a vibrating unit configured to vibrate a contact portion to which the vehicle occupant contacts; a single operating section operating the vibrating unit in a case in which an instruction to operate the vibrating unit is received, and operating the pretensioner in a case in which an instruction to operate the pretensioner is received; and a control section, in a case in which the vibrating unit is to be vibrated, outputting an instruction to vibrate the vibrating unit to the operating section, and, in a case in which the pretensioner is to be operated, outputting an instruction to operate the pretensioner to the operating section.

9 Claims, 3 Drawing Sheets

(56) References Cited

U.S. PATENT DOCUMENTS

| | | | |
|---|---|---|---|
| 2011/0115615 A1* | 5/2011 | Luo | B60R 1/00 |
| | | | 340/436 |
| 2012/0296567 A1* | 11/2012 | Breed | G01C 21/26 |
| | | | 701/468 |
| 2015/0232065 A1* | 8/2015 | Ricci | B60R 25/01 |
| | | | 701/36 |
| 2016/0009175 A1* | 1/2016 | McNew | G01C 21/365 |
| | | | 340/438 |
| 2017/0075701 A1* | 3/2017 | Ricci | G06F 9/4443 |

FOREIGN PATENT DOCUMENTS

| | | |
|---|---|---|
| JP | 7-10007 | 1/1995 |
| JP | 2946995 | 9/1999 |
| JP | 2004-224182 | 8/2004 |
| JP | 2005-530220 | 10/2005 |
| JP | 2006-168617 A | 6/2006 |
| JP | 2011-25851 A | 2/2011 |
| JP | 2013-244767 | 12/2013 |

* cited by examiner

OCCUPANT PROTECTING DEVICE FOR VEHICLE

CROSS-REFERENCE TO RELATED APPLICATION

This application claims priority under 35 USC 119 from Japanese Patent Application No. 2016-152119, filed Aug. 2, 2016, the disclosure of which is incorporated by reference herein in its entirety.

BACKGROUND

Technical Field

Preferred embodiments relate to an occupant protecting device for a vehicle.

Related Art

Japanese Patent No. 2946995 discloses a webbing device having a first pretensioner that, at the time when a collision is predicted, takes-up a webbing from its initial position, and generates a first tension. This webbing device further has a second pretensioner that, at the time it is judged that there is a collision, takes-up the webbing that is in a first tensed state, and generates a second tension.

Japanese Patent Application Laid-Open (JP-A) No. 2013-244767 discloses a traffic lane departure warning device that, in accordance with a state in which one's own vehicle departs from a traffic lane, vibrates a steering wheel and generating warning vibrations.

SUMMARY

In a case in which an operating section that operates the pretensioner, and an operating section that operates a vibrating unit that vibrates a contact portion that contacts the vehicle occupant such as the steering wheel or the like, are provided separately, there is room for improvement with respect to the flexibility in the installation positions of the operating sections.

In consideration of the above circumstances, an object of preferred embodiments is to provide an occupant protecting device for a vehicle that increases the flexibility in the installation position of an operating section.

An occupant protecting device for a vehicle of a first aspect of the disclosure includes: a pretensioner applying tension to a webbing that is configured to restrain an upper body of a vehicle occupant seated in a vehicle seat; a vibrating unit configured to vibrate a contact portion to which the vehicle occupant contacts; a single operating section operating the vibrating unit in a case in which an instruction to operate the vibrating unit is received, and operating the pretensioner in a case in which an instruction to operate the pretensioner is received; and a control section that, in a case in which the vibrating unit is to be vibrated, outputting an instruction to vibrate the vibrating unit to the operating section, and, in a case in which the pretensioner is to be operated, outputting an instruction to operate the pretensioner to the operating section.

In accordance with the occupant protecting device for a vehicle of the first aspect, due to the pretensioner being operated, tension is applied to the webbing that restrains the upper body of the vehicle occupant who is seated in a vehicle seat. Further, the contact portion to which the vehicle occupant contacts vibrates due to the vibrating unit being operated.

By a single operating section, the vibrating unit is operated in a case in which an instruction to operate the vibrating unit is received, and the pretensioner is operated in a case in which an instruction to operate the pretensioner is received. Further, by the control section, an instruction to vibrate the vibrating unit is outputted to the operating section in a case in which the vibrating unit is to be vibrated, and an instruction to operate the pretensioner is outputted to the operating section in a case in which the pretensioner is to be operated. Accordingly, the flexibility in the installation position of the operating section can be increased.

In an occupant protecting device for a vehicle of a second aspect of the disclosure, in the first aspect, the contact portion is a steering wheel, and the operating section is configured to be provided at a retractor that takes-up the webbing. Accordingly, the mass of the steering wheel can be lightened as compared with a case in which the operating section is provided at the steering wheel.

In an occupant protecting device for a vehicle of a third aspect of the disclosure, in the second aspect, the vibrating unit is provided at the steering wheel, and the retractor is a retractor of a driver's seat. Accordingly, the wiring distance between the operating section and the vibrating unit can be shortened, as compared with a case in which the operating section is provided at the retractor of a seat other than the driver's seat.

In an occupant protecting device for a vehicle of a fourth aspect of the disclosure, in the first through third aspects, in a case in which the control section senses that an own vehicle has departed from a traffic lane, the control section outputs the instruction to vibrate the vibrating unit to the operating section, and, in a case in which the control section predicts a collision of the own vehicle, the control section outputs the instruction to operate the pretensioner to the operating section. Accordingly, in a case in which it is sensed that the own vehicle has departed from the traffic lane, the vehicle occupant can be warned by vibrations, and, in a case in which a collision of the own vehicle is predicted, the vehicle occupant can be protected.

In an occupant protecting device for a vehicle of a fifth aspect of the disclosure, in the fourth aspect, in a case in which the control section predicts the collision of the own vehicle, and the vibrating unit is operating, the control section outputs an instruction to stop the vibrating unit to the operating section, and thereafter, the control section outputs the instruction to operate the pretensioner to the operating section, and the operating section stops the vibrating unit in a case in which the instruction to stop the vibrating unit is received. Namely, in a case in which the collision of the own vehicle is predicted, if the vibrating unit is in the midst of operating, in order to prioritize the taking-up of the webbing, the vibrating unit is stopped, and thereafter, the pretensioner is operated. Accordingly, the pretensioner can be operated reliably.

As described above, in accordance with the present disclosure, there is the effect that the flexibility in the installation position of an operating section can be increased.

BRIEF DESCRIPTION OF THE DRAWINGS

Preferred embodiments will be described in detail based on the following figures, wherein.

DETAILED DESCRIPTION

An exemplary embodiment for implementing the present invention is described in detail hereinafter with reference to the drawings.

Figure 1:
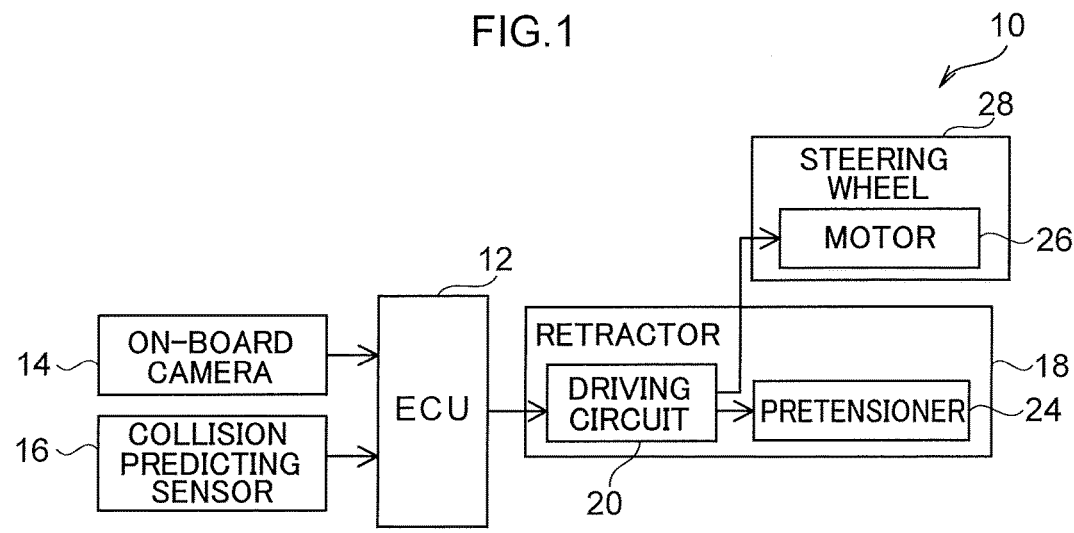
FIG. 1 is a block drawing showing an example of the schematic structure of an occupant protecting device for a vehicle relating to an embodiment.

First, the structure of an occupant protecting device 10 for a vehicle (hereinafter called "vehicle occupant protecting device 10") relating to the present embodiment is described with reference to FIG. 1 through FIG. 3. As shown in FIG. 1, the vehicle occupant protecting device 10 has an ECU (Electronic Control Unit) 12, an on-board camera 14, a collision predicting sensor 16, a retractor 18, and a driving circuit 20. Further, the vehicle occupant protecting device 10 has a pretensioner 24 and a motor 26.

The ECU 12 is structured by a microcomputer that includes a CPU (Central Processing Unit), a ROM (Read Only Memory), a RAM (Random Access Memory), and the like. Further, the on-board camera 14, the collision predicting sensor 16 and the driving circuit 20 are electrically connected to the ECU 12.

The on-board camera 14 captures images of the region in front of the own vehicle at predetermined intervals, and successively outputs, to the ECU 12, image data that expresses the images obtained.

The collision predicting sensor 16 is used for the ECU 12 to predict a collision of the own vehicle and a collision object. For example, the collision predicting sensor 16 outputs, to the ECU 12, a signal corresponding to a distance between the own vehicle and the collision object. Note that, for example, millimeter wave radar, LIDER (Laser Imaging Detection and Ranging) or the like can be used as the collision predicting sensor 16.

The ECU 12 detects white lines from the image data inputted from the on-board camera 14, and, on the basis of the detected positions of the white lines, senses that the own vehicle is departing from a traffic lane. Further, in a case in which the ECU 12 senses that the own vehicle is departing from the traffic lane, the ECU 12 outputs, to the driving circuit 20, an instruction to operate the motor 26. Concretely, in a case in which the ECU 12 senses that the own vehicle is departing from the traffic lane, the ECU 12 outputs, to the driving circuit 20, a signal that expresses that the own vehicle is departing from the traffic lane (hereinafter called "lane departure signal").

Further, on the basis of the signal inputted from the collision predicting sensor 16, the ECU 12 predicts that a collision between the own vehicle and a collision object is inevitable. In a case in which the ECU 12 predicts that a collision between the own vehicle and a collision object is inevitable, the ECU 12 outputs, to the driving circuit 20, an instruction to operate the pretensioner 24. Concretely, in a case in which the ECU 12 predicts the collision to be inevitable, the ECU 12 outputs, to the driving circuit 20, a signal expressing that this collision is inevitable (hereinafter called "collision prediction signal").

Further, in a case in which the ECU 12 predicts the collision to be inevitable, and the motor 26 is operating, the ECU 12 outputs, to the driving circuit 20, a signal expressing an instruction to stop the motor 26 (hereinafter called "motor stop signal"). Then, in this case, the ECU 12 outputs the motor stop signal to the driving circuit 20, and thereafter, the ECU 12 outputs, to the driving circuit 20, an instruction to operate the pretensioner 24 (i.e., the collision prediction signal).

The driving circuit 20 is a single electronic circuit that is provided so as to correspond to the pretensioner 24 and the motor 26, and outputs pulse signals to the pretensioner 24 and the motor 26, respectively. Due thereto, current flows to the pretensioner 24 and the motor 26, respectively, and the pretensioner 24 and the motor 26 respectively operate.

The driving circuit 20 relating to the present embodiment includes an outputting circuit that outputs pulse signals, and the like. In a case in which the lane departure signal is inputted from the ECU 12, the driving circuit 20 outputs a pulse signal to the motor 26. On the other hand, in a case in which the collision prediction signal is inputted from the ECU 12, the driving circuit 20 outputs a pulse signal to the pretensioner 24. Further, the driving circuit 20 outputs a pulse signal of a higher signal level to the pretensioner 24 than to the motor 26. Namely, current, which is larger than that which flows to the motor 26, flows to the pretensioner 24.

Further, in a case in which a motor stop signal is inputted from the ECU 12, the driving circuit 20 stops the outputting of a pulse signal to the motor 26. Due thereto, the motor 26 stops.

A webbing 22 (see FIG. 2) is a strip-shaped member that is applied to the vehicle occupant who is seated in the driver's seat, and that restrains the upper body of the vehicle occupant. One end portion in the length direction of the webbing 22 is attached via an anchor plate to the side portion at the vehicle transverse direction outer side of the seat cushion. Further, the other end portion in the length direction of the webbing 22 is attached to the retractor 18 so as to be able to be pulled-out therefrom.

The intermediate portion of the webbing 22 is inserted-through a shoulder anchor, which is provided at the upper portion of the vehicle transverse direction outer side of the seat cushion, and is folded-back. Due to a tongue plate, through which the webbing 22 is inserted, being anchored in a buckle that is provided at the vehicle transverse direction inner side of the seat cushion, the webbing 22 is applied to the vehicle occupant seated in the driver's seat.

The pretensioner 24 is provided at the retractor 18. Due to the pretensioner 24 operating and applying tension to the webbing 22, the webbing 22 is taken-up on the retractor 18. Note that what is called tension here means the force of pulling the webbing 22 in a direction of taking the webbing 22 up by the retractor 18.

In the present embodiment, the pretensioner 24 applies tension to the webbing 22 due to the motor operating caused by current that flows in accordance with the pulse signal inputted from the driving circuit 20.

Note that the structure of the pretensioner 24 is not limited to the above example. For example, the pretensioner 24 may be a member of a structure that generates gas due to an igniting device being operated, and applies tension to the webbing 22 by the pressure of the generated gas.

Figure 2:
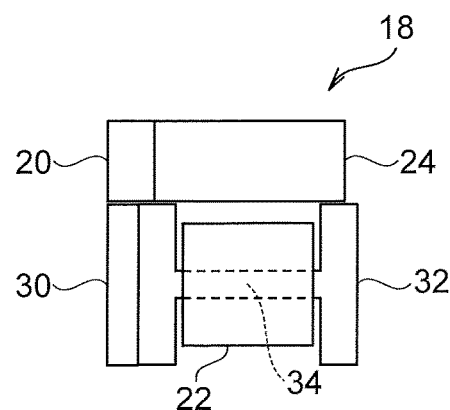
FIG. 2 is a drawing showing an example of the schematic structure of a retractor relating to the embodiment.

As shown in FIG. 2, the driving circuit 20 and the pretensioner 24 are made integral and are provided at the retractor 18 that is provided so as to correspond to the driver's seat. Further, a gear mechanism 30 that transmits driving force of the pretensioner 24 to a spool 32, and the spool 32 on which the webbing 22 is taken-up, are provided at the retractor 18. The retractor 18 is provided at the lower portion of the center pillar that is at the driver's seat side.

When the pretensioner 24 operates, the driving force of the pretensioner 24 is transmitted to the spool 32 by the gear mechanism 30, and the webbing 22 is taken-up onto a take-up shaft 34 of the spool 32.

Figure 3:
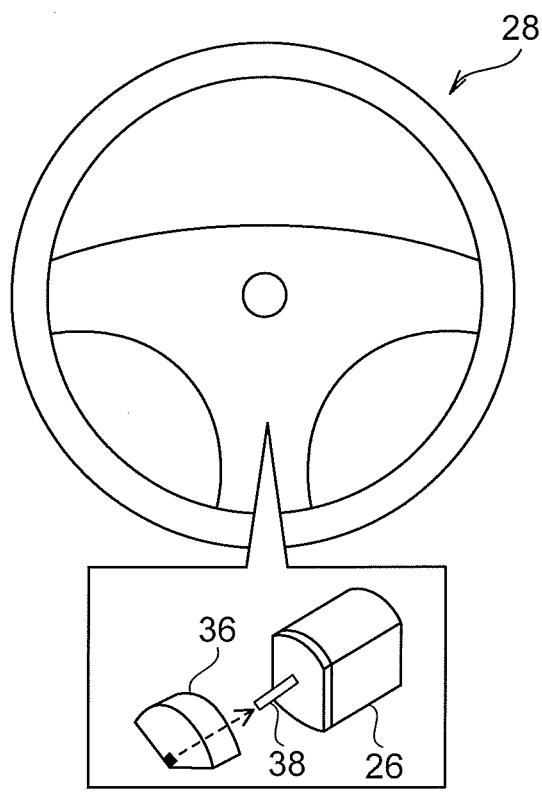
FIG. 3 is a front view showing an example of the schematic structure of a steering wheel relating to the embodiment.

On the other hand, as shown in FIG. 3, the motor 26 is provided at the lower portion of the center of the frame of a steering wheel 28. A weight 36 that is eccentric is mounted to a shaft 38 of the motor 26. Due to the motor 26 operating, the weight 36 rotates, and the steering wheel 28 vibrates. Further, due to the steering wheel 28 vibrating, a warning is given to the vehicle driver who is operating the steering wheel 28.

Note that, in the present embodiment, the motor 26 is an example of the vibrating unit, and the steering wheel 28 is an example of the contact portion. Further, in the present embodiment, the driving circuit 20 is an example of the operating section, and the ECU 12 is an example of the control section.

Figure 4:
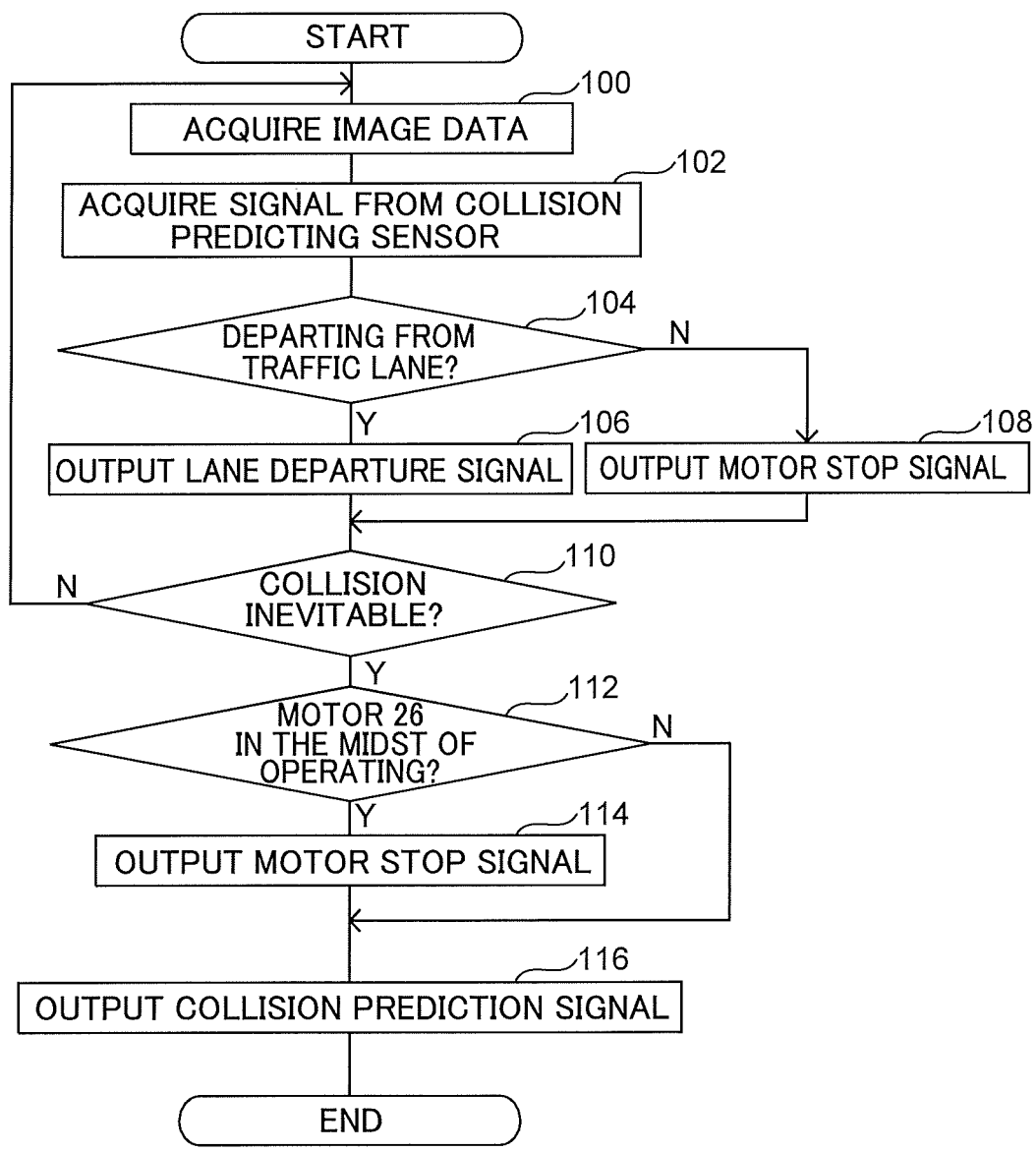
FIG. 4 is a flowchart showing an example of the flow of processings that are executed at the occupant protecting device for a vehicle relating to the embodiment.

Operation of the vehicle occupant protecting device 10 relating to the present embodiment is described next with reference to FIG. 4. Note that FIG. 4 is a flowchart showing an example of the flow of processings that are executed at the ECU 12 of the vehicle occupant protecting device 10 relating to the present embodiment. Further, in the present embodiment, the processings shown in FIG. 4 are carried out due to the ECU 12 executing a program that is stored in advance in the ROM. Execution of the processings shown in FIG. 4 starts when, for example, an unillustrated ignition switch is turned on.

In step 100 of FIG. 4, the ECU 12 acquires image data expressing images obtained by the on-board camera 14. In next step 102, the ECU 12 acquires the output signal of the collision predicting sensor 16.

In next step 104, as described above, on the basis of the image data acquired in step 100, the ECU 12 judges whether or not the own vehicle is departing from the traffic lane. If this judgment is negative, processing moves on to step 108. If this judgment is affirmative, processing moves on to step 106.

In step 106, the ECU 12 outputs the lane departure signal to the driving circuit 20. Due to the processing of present step 106, a pulse signal is outputted from the driving circuit 20 to the motor 26, and current flows to the motor 26. Further, due to current flowing to the motor 26, the weight 36 is rotated, and the steering wheel 28 vibrates. Note that, in step 106, in a case in which the motor 26 is already operating, the ECU 12 does not have to output the lane departure signal to the driving circuit 20.

On the other hand, in step 108, the ECU 12 outputs the motor stop signal to the driving circuit 20. Due to the processing of present step 108, outputting of the pulse signal from the driving circuit 20 to the motor 26 is stopped, and driving of the motor 26 is stopped. Note that, in present step 108, in a case in which the motor 26 is already stopped, the ECU 12 does not have to output the motor stop signal to the driving circuit 20.

In step 110, on the basis of the output signal acquired in step 102, the ECU 12 judges whether a collision between the own vehicle and a collision object is inevitable. If this judgment is negative, processing returns to step 100, whereas if this judgment is affirmative, processing moves on to step 112.

In step 112, the ECU 12 judges whether or not the motor 26 is in the midst of operating. If this judgment is negative, processing moves on to step 116. If this judgment is affirmative, processing move on to step 114. In step 114, in the same way as in step 108, the ECU 12 outputs the motor stop signal to the driving circuit 20. Due to the processing of present step 114, outputting of the pulse signal from the driving circuit 20 to the motor 26 is stopped, and driving of the motor 26 is stopped.

In step 116, the ECU 12 outputs the collision prediction signal to the driving circuit 20, and thereafter, the present processing routine ends. Due to the processing of present step 116, a pulse signal is outputted from the driving circuit 20 to the pretensioner 24, and the pretensioner 24 operates. Due to the pretensioner 24 operating, the webbing 22 is taken-up onto the retractor 18.

As described above, in accordance with the present embodiment, the pretensioner 24 and the motor 26 respectively are operated by the single driving circuit 20. Due thereto, the flexibility in the set position of the driving circuit 20 can be improved, as compared with a case in which the pretensioner 24 and the motor 26 are respectively operated by plural, different driving circuits. Moreover, cost and mass can be reduced, as compared with a case in which the pretensioner 24 and the motor 26 are respectively operated by plural, different driving circuits.

Note that in the above-described embodiment, the driving circuit 20 is provided at the retractor 18 that is provided so as to correspond to the driver's seat. However, the present invention is not limited to the same, and may be a form in which, for example, the driving circuit 20 is provided at a retractor that is provided so as to correspond to another seat such as the front passenger's seat or the like.

Further, in the above-described embodiment, a warning is given to the vehicle occupant by vibrating the steering wheel 28, but the present invention is not limited to this. For example, the present invention may be a form in which the vehicle occupant is given a warning due to another member that the vehicle occupant contacts, such as the vehicle seat, the accelerator pedal that the vehicle occupant operates with his/her foot, or the like, being vibrated.

Further, the processing that is carried out at the ECU 12 in the above-described embodiment is software processing that is carried out by execution of a program. However, the processing carried out at the ECU 12 may be processing that is carried out by hardware. Further, the processing carried out at the ECU 12 may be processing that is carried out by a combination of both software and hardware. Moreover, the program that is stored in the ROM may be stored on any of various types of storage media and distributed.

The present invention is not limited to the above-described embodiment, and, other than the above-described embodiment, can of course be implemented by being modified in various ways within a scope of the claims.

What is claimed is:

1. An occupant protecting device for a vehicle, comprising:
   a pretensioner applying tension to a webbing that is configured to restrain an upper body of a vehicle occupant seated in a vehicle seat;
   a motor configured to vibrate a contact portion to which the vehicle occupant contacts;
   a single operating section operating the motor in a case in which an instruction to operate the motor is received, and operating the pretensioner in a case in which an instruction to operate the pretensioner is received; and
   a control section, in a case in which the contact portion is to be vibrated, outputting an instruction to operate the motor to the operating section, and, in a case in which the pretensioner is to be operated, outputting an instruction to operate the pretensioner to the operating section, wherein:

in a case in which the control section predicts the collision of the own vehicle, and the motor is operating, the control section outputs an instruction to stop the motor to the operating section, and thereafter, the control section outputs the instruction to operate the pretensioner to the operating section, and the operating section stops the motor in a case in which the instruction to stop the motor is received.

2. The occupant protecting device for a vehicle of claim 1, wherein:

the contact portion is a steering wheel, and the operating section is configured to be provided at a retractor that takes-up the webbing.

3. The occupant protecting device for a vehicle of claim 2, wherein:

the motor is provided at the steering wheel, and the retractor is a retractor of a driver's seat.

4. The occupant protecting device for a vehicle of claim 2, wherein the single operating section is a driving circuit, and the driving circuit and the pretensioner are made integral and are provided at the retractor.

5. The occupant protecting device for a vehicle of claim 4, wherein, the driving circuit is an electronic circuit that is provided so as to correspond to the pretensioner and the motor.

6. The occupant protecting device for a vehicle of claim 5, wherein the electronic circuit outputs pulse signals to the pretensioner and the motor, respectively.

7. The occupant protecting device for a vehicle of claim 6, wherein the pretensioner applies tension to the webbing due to a motor operating caused by current that flows in accordance with the pulse signal inputted from the electronic circuit.

8. The occupant protecting device for a vehicle of claim 6, wherein a weight is mounted to a shaft of the motor.

9. The occupant protecting device for a vehicle of claim 1, wherein, in a case in which the control section senses that an own vehicle has departed from a traffic lane, the control section outputs the instruction to operate the motor to the operating section, and, in a case in which the control section predicts a collision of the own vehicle, the control section outputs the instruction to operate the pretensioner to the operating section.

* * * * *